Aug. 19, 1969     J. B. KAHOUN ETAL     3,462,680
METHOD AND APPARATUS FOR MAGNETICALLY MEASURING THE
THICKNESS OF A MOVING WEB AND FOR ENGAGING AND
DISENGAGING SAID APPARATUS WITH THE WEB
Filed Dec. 6, 1965     2 Sheets-Sheet 2
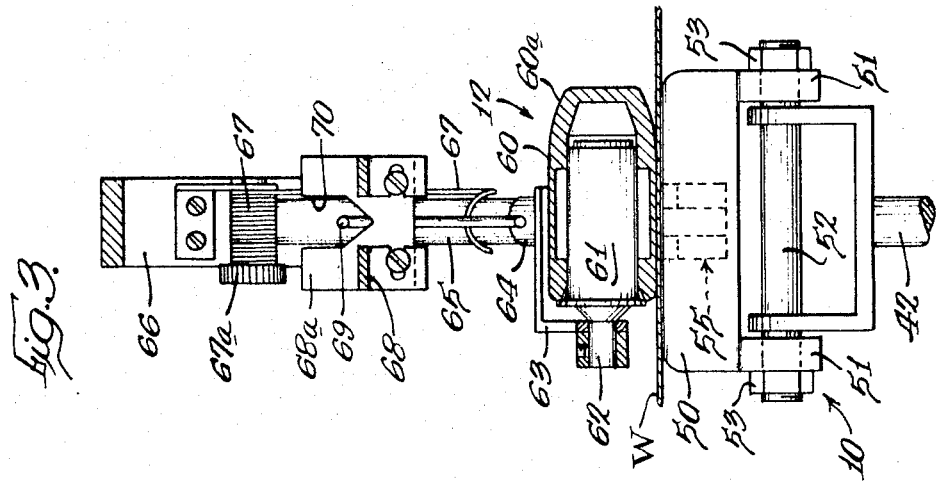
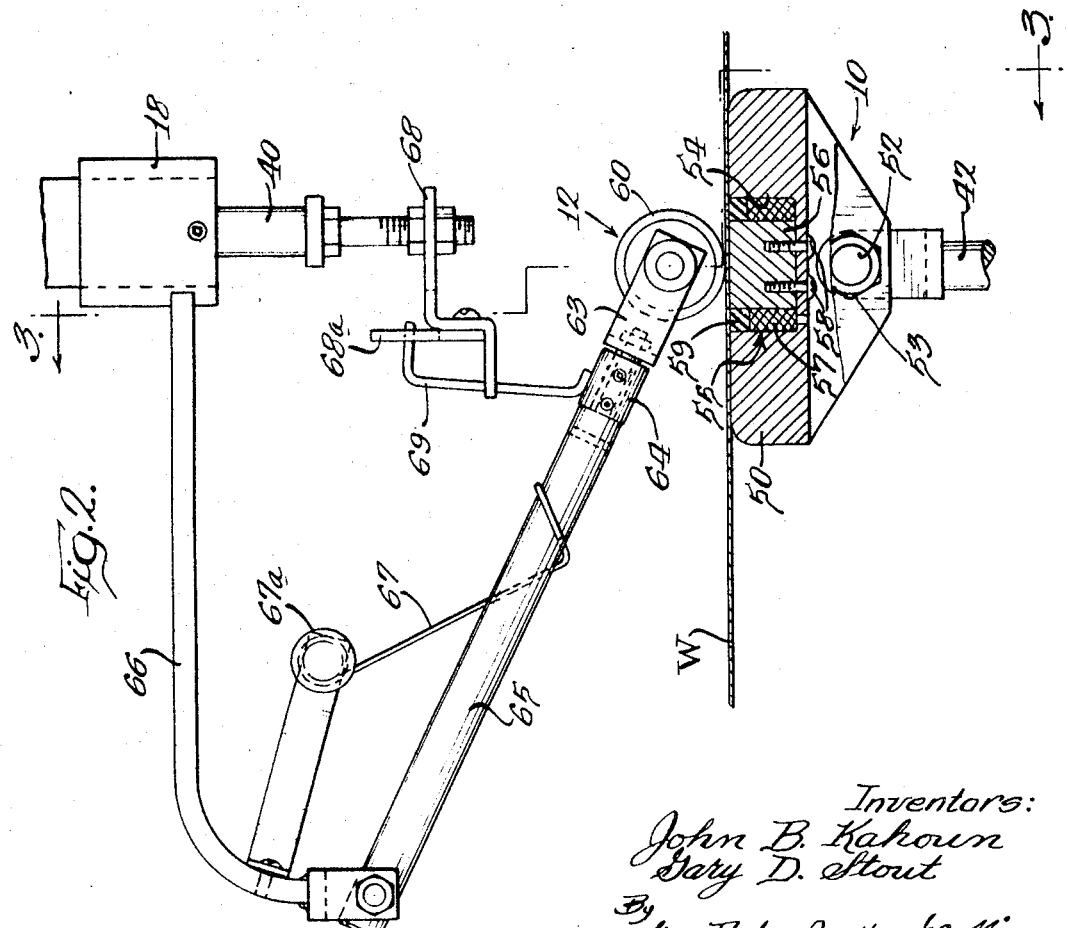
Inventors:
John B. Kahoun
Gary D. Stout
By
Gary Parker, Juettner & Cullinan
Attys

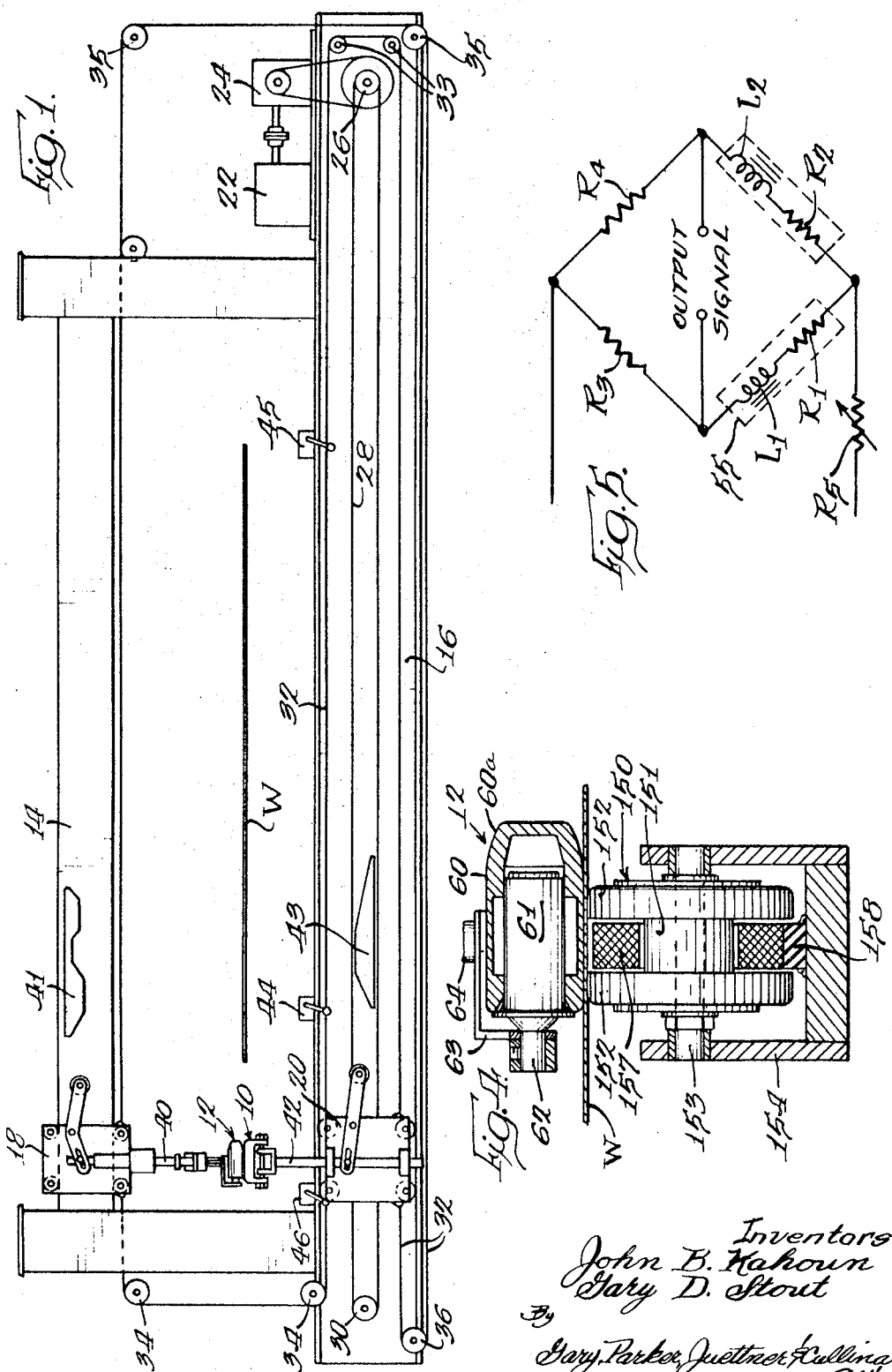

United States Patent Office 3,462,680
Patented Aug. 19, 1969

3,462,680
METHOD AND APPARATUS FOR MAGNETICALLY MEASURING THE THICKNESS OF A MOVING WEB AND FOR ENGAGING AND DISENGAGING SAID APPARATUS WITH THE WEB
John B. Kahoun and Gary D. Stout, Wisconsin Rapids, Wis., assignors to Consolidated Papers, Inc., Wisconsin Rapids, Wis., a corporation of Wisconsin
Filed Dec. 6, 1965, Ser. No. 511,663
Int. Cl. G01 33/12
U.S. Cl. 324—34
6 Claims

ABSTRACT OF THE DISCLOSURE

An improved magnetic caliper gauge for continuously measuring the thickness of a moving web of non-magnetic material including improved guide means and the like for controlling the orientation of a moveable detector member such as an electromagnetic reactor or a magnetically permeable shoe as the same is moved up and down into and out of engagement with a moving web, and a method for bringing two detector units into engagement with a moving web for measuring the caliper thereof where at least one of the detector units comprises a roller which is brought up to the speed of the web through engagement with an unsupported portion of the web.

---

The present invention relates to gauge means for determining the characteristics of materials having large surface areas, and particularly, to improved gauge means for determining the caliper or variations in caliper or caliper profile occurring across the width of sheet materials, especially traveling webs of sheet material.

In several industries, notable among which is the paper industry, continuous webs of sheet material are formed and/or processed at high speed. To determine the characteristics of the material being formed and/or the effect of process steps being performed thereon, it is necessary to make several measurements. Preferably, these measurements are made directly on the web as it travels through the forming or processing machinery to afford an immediate determination of the factor or factor sought to be known.

In the copending application of John B. Kahoun, Ser. No. 313,476, filed Oct. 3, 1963 now Patent No. 3,411,075, apparatus is disclosed for measuring the caliper and cross-machine caliper profile of traveling webs of non-magnetic sheet materials, and particularly for measuring the caliper profile of webs of paper directly on papermaking machines at papermaking speeds. The apparatus, which is believed to be the first capable of making such measurement under the stated on-the-machine conditions, is characterized by a caliper head containing an electromagnetic reactor or inductor adapted to be contacted with one side of a moving web, a magnetically permeable shoe adapted to be contacted with the other side of the web in opposed relation to the reactor, and means for measuring an electric circuit variable that is proportional to the reluctance of the magnetic circuit defined between the head, the shoe and the intervening web of paper or the like. Since the reluctance gap of the reactor or inductor is formed essentially by the web, the reluctance of the circuit is proportional to the thickness of the web, and the caliper of the web can thus be measured. By use of appropriate apparatus, the head and the shoe can be made to conjointly traverse the web, and the caliper profile can be graphically portrayed on an X–Y recorder to give a direct reading of cross machine variations in web formation and/or treatment.

The object of the present invention is to provide improvements in said caliper measuring gauge means, especially to render the same more reliable on relatively fragile and/or thin sheet materials and at high web speeds; to improve the structure of the head and shoe; to provide for improved and more reliable traversing of the web; and to mitigate breaking of or damage to the web as a consequence of caliper measurement.

In order to acquaint those skilled in the art with the manner of making and using our improved caliper gauge means, we shall describe, in connection with the accompanying drawings, preferred embodiments of our gauge means and preferred manners of making and using the same, and constituting the best mode contemplated by us for carrying out our invention.

In the drawings, wherein like reference numerals indicate like parts:

FIGURE 1 is a front (i.e., cross machine) view of a paper machine or the like illustrating a preferred embodiment of our gauge means and gauge traversing means;

FIGURE 2 is a side view of the gauge means of FIGURE 1;

FIGURE 3 is a vertical section of the gauge means taken substantially on line 3—3 of FIGURE 2;

FIGURE 4 is a view similar to FIGURE 3 of a modified form of the gauge means; and FIGURE 5 is a schematic circuit diagram of the caliper head electric circuit.

Referring now to the drawings, and particularly to FIGURE 1, we have shown a gauging device comprised of a measuring head 10 and a complementary shoe 12 adapted to be engaged with the opposite sides of a traveling web W, and to be moved transversely across the web. To move the members, a traversing mechanism is provided which may suitably comprise a pair of vertically spaced parallel beams 14 and 16 disposed respectively above and below the web at right angles to the direction of web travel. Each beam slidably supports and guides a carriage 18 and 20, respectively, for movement transversely of the web. An electric motor 22 disposed adjacent one end of the lower beam 16 drives, through the intermediary of a change speed transmission 24, a pulley 26 over which an endless belt 28 is reaved, the belt being supported adjacent the opposite end of the beam by an idler pulley 30 and being connected to the lower carriage 20 for reciprocating said carriage along the lower beam.

Dead-ended onto the lower carriage is a second belt 32 running from the right side of the carriage 20 to a pair of vertically spaced pulleys 33 at the right side of the lower beam, back across the machine beneath the web to a pair of vertically spaced pulleys 34 at the left side of the beams and above the web to the left side of the upper carriage 18; then from the right side of the upper carriage across the machine above the web to a pair of vertically spaced pulleys 35 at the right side of the beams, back across the machine adjacent the lower edge of beam 16 to a pulley 36 at the left end of the lower beam and then to the left side of the lower carriage 20, whereby the upper carriage is coupled to the lower carriage and is caused to duplicate the movements of the lower carriage. The illustrated mechanism is but one known means of traversing the detector assembly.

The upper traverse carriage 18 includes clutch and drive means (not shown) for reciprocating a vertically disposed rod 40 which controls the detector shoe 12, whereby the shoe is controllably movable toward and away from the upper surface of the web. The lower traverse carriage 20 in turn mounts a rod 42 which carries the detector head 10 and which is normally biased upward to engage the head with the lower surface of the web.

The traverse mechanism is remotely controlled from a cabinet location convenient to the paper machine operator. Only two controls need be available to the operator, namely, a selector switch and a push button. The operator selector switch has "automatic-off-manual" selection available. In the "automatic" position, a traverse will be made at every closing of an automatically operated switch, which may be operated either by a timer or some mechanism correlated to paper production for causing periodic measurements to be made. Holding this switch closed would cause continuous traversees to be made until the switch were opened. Placing the operator selector switch in the "manual" position allows the system to make one complete traverse every time the push button is pressed. Electric circuits for the stated purposes are obvious to those skilled in the art, and none is shown herein.

Between traverses, the detector assembly of head 10 and shoe 12 is located in a safe or sheltered position to one side of the web as shown in FIGURE 1. When a traverse is initiated by the automatic switch or by the operator push button, the traverse motor 22 is energized to conjointly drive the top and bottom traverse carriages 18 and 20 to a position located about two to six inches in from the side of the web. During this movement, the rod 42 engages a cam 43 which causes the detector head 10 to be lowered below the web W as the shoe passes the edge of the web. At the same time, the clutch in the upper traverse carriage releases the rod 40, but the rod immediately comes under the control of a cam 41 whereby the shoe 12 is held elevated relative to the web until it reaches said position slightly inwardly from the edge of the web, whereupon a cut-out in the cam permits the rod to move downward to lower the shoe gently onto the web. At this point, the lower carriage 20 trips a timer 44 or the like which serves to deenergize the motor 22 for a predetermined period of time (for example, five seconds), whereby the carriages are stopped in their described positions.

As shown in the drawings, the detector shoe 12 is a roller journalled on an axis substantially parallel to the web and extending at right angles to the direction of web movement. As the roller is gently lowered onto the web under control of the cam 41, the roller engages a portion of the web which at the moment is unsupported so that tearing or shear forces are minimized as the roller engages the web. Due to the timer, the roller is held in engagement with the traveling web for a sufficient period of time to cause the roller to be rotated and brought up to a peripheral speed approximately equal to the linear speed of the web.

Upon expiration of the preselected time interval, the timer again sets the motor 22 into operation to move the carriages 18 and 20 further to the right. Such further movement initially results in the cam 41 again raising the roller 12 from the web, but without interfering with its rotation, whereby the roller continues to spin at approximately the speed of web travel. Immediately thereafter, the cam 43 permits the head 10 to move relatively slowly upward, whereby the head 10 engages the lower surface of the web at a portion thereof which at the moment is unsupported or unconfined, again to minimize tearing or shear forces. The head 10 continues to rise to its maximum upward extent of movement, and in so doing raises the web up into re-engagement with the rotating roller 12, and preferably also raises the roller to a slight extent. Thereafter, as the carriages move to the right, the cam 41 releases the rod 40 whereupon the roller is free to ride on the portion of the web supported by the head 10.

The caliper or caliper profile record is then made by simultaneously moving the carriages 18 and 20 from adjacent the left side to adjacent the right side of the web while the head 10 and shoe 12 are engaged with the web. The traverse stops at a point about two to six inches in from the right side of the web by virtue of the carriage 20 engaging a limit switch 45. The switch 45 operates to reverse the traverse motor 22 for causing the mechanism to be moved quickly to the left side of the machine. As the direction of drive is reversed, the clutch and drive mechanism in the upper carriage 18 raises the rod 40 to raise the roller 12 free of the web, whereby the web is not confined between the two heads on the reverse stroke. If desired, means could be provided for lowering the head 10 out of contact with the web, but to date this has not been found to be necessary. However, the head 10 (as well as the roller 12) is moved clear of the web when passing the edge (the left hand edge) thereof, on both the traverse and return strokes, by the cam 43. The traverse cycle is stopped when the limit switch 46 is operated by the carriage 20.

Should a paper break occur while a traverse is being made, a paper break switch is provided to automatically separate the detector elements 10 and 12 from the web. Such switch may suitably be operated by the photocells which are normally available at several locations on a paper machine to sound an alarm when a break occurs.

Referring to FIGURES 2 and 3, the detecting head 10 and roller shoe 12 will now be described in detail. As shown, the head 10 is comprised of an inverted generally U-shaped body 50, the legs 51 of which are apertured to facilitate pivotally adjustable mounting of the body on the support rod 42, as by means of the bolt 52 and nuts 53. The body is suitably formed of a unitary piece of magnetically permeable material, such as mild steel, and is provided substantially centrally of the outer or upper face of the bight portion thereof with a rectangular hole or recess 54.

Mounted within the hole or recess 54 is an electromagnetic reactor or inductor 55 comprised of a rectangular core 56 of mild steel or the like and a coil 57 wound about the core. The reactor 55 is preferably secured within the recess by a pair of screws 58 extended through the lower wall of the recesed portion of the body 50 and threaded into the core 56, and by an Epoxy cement or the like, indicated at 59, which fills the spaces between the body, the core and the coil. After assembly, the faces of the body, the coil and the cement are machined down to a perfectly smooth planar web engaging surface, and a thin coating of wear and corrosion-resistant material is applied to said surface. This coating may be chromium or the like, or may comprise a thin layer of Teflon or a similar material having an extremely low coefficient of friction whereby to reduce to a minimum the frictional engagement between the head and the web. Also, the edges of the head are smoothly curved to mitigate the possibility of damage to the web.

According to the present invention, the shoe 12 comprises a magnetically permeable hollow roller 60 of low mass and inertia. The roller is mounted by anti-friction bearing means 61 of high quality on a cantilevered axle 62 which extends substantially parallel to the plane of the web and at right angles to the direction of web travel. The axle is supported by an L-shaped bracket 63, one leg of which parallels the roller and carries a collar 64 whose axis substantialy intersects the center of gravity of the roller. The collar is journalled on the lower end of an upwardly inclined rod 65 which extends upstream from the roller relative to the web and is pivotally mounted at its upper end on an axis generally parallel to the axis of rotation of the roller 60. Thus, the roller is mounted with ultimate freedom for up and down movement about the pivot axis of the rod 65 and for tilting movement about the common axis of the rod and the collar 64.

The rod 65 is pivotaly supported by a bracket 66 secured to the upper traverse carriage 18, and a torsion spring 67 also supported by said bracket bears on the rod normally to bias the rod and the roller downwardly toward the web. Preferably, this spring is adjustable by means of knob 67a or the like to maintain the proper, relatively light (e.g. 18 ounces or so) biasing pressure on the roller at its line of contact with the web.

The roller controlling rod 40 is slidably mounted on the carriage 18 for movement in accordance with the dictates of the traversing mechanism and the cam 41 as previously described. At its lower end, the rod carries a bracket 68 which extends into overlying relation to the collar 64 for cooperation with a bent rod or pin 69 secured to and extending upwardly from the collar.

The bracket 68 is adjustably mounted on the lower end of the rod 40 to assure the proper elevation thereof relative to the web and roller, and the bracket is preferably comprised of two parts laterally adjustable relative to one another to insure proper alignment thereof with the roller and the pin 69. The laterally adjustable member 68a of the bracket is provided therein with a vertical slot 70 receiving the forwardly extending portion of the pin 69, the upper regions of the slot receiving the pin with freedom for up and down and tilting movements and the slot terminating at its bottom in a V-shaped surface portion for centering the pin relative to the bracket and restraining the pin against movement when the pin is engaged therein.

In use, the member 68a of the bracket is so adjusted that when the pin 69 is engaged in the V-shaped terminal part of the slot 70, the roller 60 is disposed parallel to the web. Consequently, the roller is always lowered into and raised from the web in a condition of substantial parallelism to the web. Once the roller is engaged with the web, both upon initial contact to bring the roller up to speed and upon final contact for measuring, the bracket is lowered relative to the pin to dispose the latter in the upper regions of the slot 70, whereupon the roller is free to move up and down and to tilt as may be dictated by the web and any imperfections that may exist in the web.

As shown in FIGURE 2, the roller 60 is further so supported relative to the caliper head 10 that the roller is in a magnetically centered position relative to the reactor 55. To afford an effective magnetic path and magnetic field balance, the roller may include internal bosses or the like as shown.

Also, in its preferred embodiment, the roller includes a tapered nose portion 60a (which does not enter into the magnetic circuit) extending in the direction of profile measuring, web traversing movement to mitigate damage to the web.

With the head 10 and shoe 12 contacted with opposite sides of a non-magnetic web, such as a web of paper, as shown in FIGURES 2 and 3, and the coil 57 energized from a suitable source, the soft iron or mild steel bodies 50 and 60 of the head 10 and shoe 12 form a flux path for the electromagnet coil. In this path or magnetic circuit, the space or gap between the two bodies, being occupied by the non-magnetic web W, constitutes a high reluctance path, the reluctance of which varies in proportion to the width or thickness of the gap. The change in the reluctance of the magnetic circuit is reflected as an inductive change in the reactor 55, whereby the inductance of the coil 57 is proportional to the thickness of the web W since the web in essence defines the reluctance gap.

As shown in FIGURE 5, the detector or reactor 55 is comprised of resistance $R_1$ and inductance $L_1$, which together make up the circuit value determining the impedance of the device. The impedance is thus proportional to the inductance, so that if the other pertinent factors remain reasonably constant, reactor impedance is proportional to the width of the gap between the bodies 50 and 60, and thus to the thickness of the web W.

Impedance, applied voltage and current flowing through the coil 67 are interrelated, so that variations in the inductance of the reactor, produced by variations in the thickness of the non-magnetic web W, will produce proportional variations in the impedance and at least one of the voltage drop across and the current flowing through the reactor coil 57. It does not matter whether the variations be of linear or functional proportion, or be directly or inversely proportional, it suffices for purposes of this invention that the variations are in proportion to one another.

It is thus apparent that an inductance variation caused by change in the reluctance gap between the bodies 50 and 60 may be determined by selecting a measuring quantity and appropriately devising the circuit in manners obvious to those skilled in the art so that the selected quantity will have a significant variation proportional to variations in the gap of the magnetic circuit of the reactor or detector 55. The measuring quantity could be any of:

A. The voltage drop across the detector.
B. The impedance change of the detector.
C. The current flowing through the detector.
D. The voltage drop across a resistor in series with the detector.
E. The phase relationship of the voltage across the detector.

It is suggested that the most readily measured quantities are variations in current flow under constant voltage, and variations in voltage under constant current. The latter condition is readily established (or reasonably nearly so) by connecting in series with the reactor a resistor $R_3$ of large magnitude compared to inductor impedance, whereby changes in the reluctance gap caused by change in the thickness of the web W may be measured as a function of the change in the voltage drop across the inductor. The "output signal" is preferably derived as a compensated signal, or as a signal correlated to a base reference, by utilization of an output bridge such as shown in FIGURE 5. In this circuit, the variations occurring in the detector 55 are compared to or compensated by a reference or compensating device in the form of a second reactor comprised of resistance $R_2$ and inductance $L_2$; the resistance $R_3$ in series with the reactor 63 being balanced by resistance $R_4$ in series with the compensator.

In addition, the same coil 57 and magnetic circuit members 50 and 60 are capable of exerting a magnetic holding force between said members through the web whereby to hold said members flush against the web with the web in a flat or planar position therebetween. Heretofore, the magnetic holding force was provided by a separate electromagnet, but we have found that by simply making the coil 57 with an adequate number of ampere-turns, the reactor coil itself will perform the holding function. In the FIGURE 2 embodiment of the invention, the two-fold function of the coil is attained in respect of measurement of book paper by providing a coil having a magnetizing force of between 50 and 100 ampere-turns per inch. For our coil, we use 600 turns of No. 30 magnet wire. Manifestly, we could use other equivalent coil structures, such as 300 turns of No. 29 magnet wire. Also, in this embodiment, the magnetic holding force is used to supplement the force of the spring 67, but it is manifest that the magnetizing force could be the sole holding force, supplemented only by the effects of gravity on the roller. If desired, a variable holding force can be accommodated by including a rheostat $R_5$ in the coil circuit.

In a physical embodiment of the invention that has proven successful in determining the caliper profile of light-weight book papers (less than 30 lbs. per 3300 sq. ft.) formed at high speeds (1600 f.p.m. and over), the shoe 12, i.e., the roller 60, is 2⅜ inches long and 1¼ inches in diameter. For co-operation with this shoe, we have used a head 10 having a face 3¼ inches wide and 4 inches long (in the machine direction). The central recess is 1½ inches long, ¾ inch wide and ¾ inch deep, and substantially filled by the reactor. Due to the relative dimensions, the mechanical tolerances imposed on the traverse mechanism are minimized. Also, since the shoe and head are free to float relative to the web, and since magnetic forces hold the shoe and head flat on the web with intimate contact, inaccuracies in the traverse beams or carriage guides are readily tolerated.

The ability of the above-described device to measure thickness using the electrical principle involved was confirmed early. The application of this to a moving web of paper, however, was problematic. The necessity of contacting both sides of the sheet presented great concern as to runability, sheet damage and method of application. Tests established that the bottom member 10 could be brought into contact with the sheet without any problem. Setting the top member on the moving web, supported by the bottom shoe, constituted a real problem. Specifically, the top detector must be applied without breaking the web and must then remain in intimate contact with the web throughout the entire traverse.

Although it is important that the mass and inertia of the top member be kept low, it is also necessary to have the same large enough to provide a significant flux path for the reactor. According to the present invention, all of these problems are solved by the combination of one or more and preferably all of the features of (a) mounting the reactor in the bottom member, which can be relatively bulky, and using the top member simply as a cooperative shoe, (b) forming the top member as a hollow roller of low mass and inertia, (c) minimizing the intertia by rotating the roller up to approximately web speed before attempting to confine the web between the two members, (d) engaging the web with the bottom member and thereafter confining the web beneath the rotating top member, (e) utilizing the web itself to bring the roller up to speed by initial engagement of the roller with an unsupported portion of the web, (f) engaging the roller with the web in a condition of parallelism thereto, (g) permitting the top member freedom of movement once it is engaged with the web, and (h) not engaging the edges of the web.

As a consequence of the above factors, and application of the holding force primarily magnetically between the head and the shoe, the traverse mechanism need only (1) move the head and the shoe to the correct position over the web, (2) gently lower the roller onto the unsupported web to bring the roller up to aproximately the speed of the web, (3) raise the roller above the web, (4) engage the head 10 with the lower surface of the web at a point aligned with the head, (5) maintain with relative accuracy the aligned position of the roller over the head during traverse, and (6) lift the roller off the moving web at the end of the traverse. Thus, the device of this invention is not reliant upon and does not require a precision traverse mechanism, yet affords precision measurement of the cross-machine caliper profile of a paper web as it is being formed, and affords means for instantaneously recording such profile for the benefit of the machine operators.

In an immediate application, the device of our invention has been installed in a papermaking machine producing light-weight book papers at speeds in the order of 1600–1900 feet per minute. Many traverses have been made on a variety of basic weights at a variety of machine speeds. Caliper profiles have been extremely accurate, and paper breaks due to the calipering device are practically nil. There is practically no detectable marking of the web by the device, even on test traverses at web speeds up to 3000 feet per minute.

The apparatus of the invention is, of course, applicable to various areas of papermaking and processing machines, and is further applicable to substantially any area of any apparatus that handles or processes non-magnetic traveling webs.

While the above described embodiment of the apparatus has proven highly advantageous, additional reliability and further mitigation against web breakage may be incorporated in the apparatus by formation of both the shoe 12 and the head 10 as rollers, as is shown in FIGURE 4. In this embodiment, the upper roller or shoe construction and mounting are the same as previously described, but the lower head assembly is comprised of a magnetically permeable spool 150 having a shaft or cylinder portion 151 and circular flanges 152 which are adapted to engage the lower surface of the web at their peripheries for rotation with the web.

The spool is journalled on a shaft 153 secured to a U-shaped member 154 which is adapted to be mounted on the rod 42, whereby the spool has relatively low mass and inertia. The mounting is such, of course, that the two rollers are aligned or balanced magnetically relative to one another.

The flux producing electromagnetic coil 157 is in the form of a cylinder or torus freely encircling the body 151 of the spool between the flanges thereof, and the coil is secured to the mounting member 154 independently of the spool by a mounting block 158 or the like. In this manner the spool is free to rotate mechanically relative to the coil, but has a constant electromagnetic relationship to the coil for flux path formation. By virtue of this assembly, the spool may be formed of as low a mass as possible, its mass is not increased by necessity for carrying a coil, and no slip ring structure is required for carrying current to the coil.

In use of this modified form of apparatus, it is preferable to incorporate a cam for the lower roller and a timer that would essentially duplicate the functions of the cam and timer for the top roller, i.e., that would permit the lower roller to be moved into engagement with an unsupported portion of the web to bring the lower roller up to approximately the speed of the web. Suitably, this could be done after the upper roller has been brought up to speed and raised from the web, and before the upper roller and the web are re-engaged (whether by continued upward movement of the lower roller and the web or by lowering movement of the upper roller).

It is thus apparent that the present invention provides significant advantages in the gauging of traveling webs and other sheet materials, and particularly provides means for obtaining the cross-machine caliper profile of non-magnetic traveling webs in a most efficient manner. It is believed, therefore, that all of the objects and advantages of the invention have been shown herein to be attained in a convenient, economical and practical manner.

While we have shown and described what we regard to be the preferred embodiments of our invention, it is to be appreciated that various changes, rearrangements and modifications may be made therein without departing from the scope of the invention, as defined by the appended claims.

We claim:

1. In a device for determining caliper of a moving web of non-magnetic sheet material by measurement of the reluctance gap introduced by the sheet into a magnetic circuit formed by a caliper head member containing an electromagnetic reactor contacted with one side of the web and a magnetically permeable shoe member opposed to the reactor and contacted with the other side of the web, the improvement comprising rod means pivoted on a horizontal axis and having swivel bracket means mounted on its free end for carrying one of said members with freedom for up and down and tilting movement relative to said web, said rod means accommodating the up and down movement and said swivel bracket means being movable about the axis of said rod means to accommodate tilting movement of said one member, said one member being in the form of a roller, support means for engaging said roller with and disengaging the same from the web by up and down movement thereof relative to the web, said support means including guide means engageable with said swivel bracket means for maintaining said roller parallel to the plane of the web during movement of said roller into and out of engagement with the web and disengageable from said swivel bracket means when said roller has been engaged with the web to accommodate freedom of movement thereof.

2. In a device for determining caliper of a moving web of non-magnetic sheet material by measurement of the reluctance gap introduced by the sheet into a magnetic circuit formed by a caliper head member containing an electromagnetic reactor contacted with one side of the material and a magnetically permeable shoe member opposed to the reactor and contacted with the other side of the material, the improvement comprising means mounting one of said members with freedom for up and down and tilting movement relative to the web, means for engaging said one member with and disengaging the same from the web by up and down movement thereof relative to the web, said last named means including guide means engageable with said mounting means for maintaining said one member parallel to the plane of the web during movement of said one member into and out of engagement with the web and disengageable from said mounting means when said one member has been engaged with the web to accommodate freedom of movement thereof, said mounting means comprising a rod pivoted on a first axis accommodating up and down movement of said one member and a swivel connection between said rod and said one member accommodating tilting movement of said one member, said one member including a pin projecting therefrom, said guide means comprising a guide member movable upwardly and downwardly relative to the web and the said one member and having a slot therein receiving said pin with freedom for up and down and tilting movement of said pin and said one member, said slot having a V-shaped terminal portion engageable with said pin when said guide member is moved away from the web, said V-shaped portion retaining said pin and said one member against movement relative to said guide member.

3. A process of engaging a pair of detector units with opposite sides of a traveling web wherein at least one of the units is a roller journalled on an axis substantially parallel to the plane of the web and transverse to the direction of web movement, comprising the steps of, first, engaging the roller with the respective side of an unsupported portion of the web to cause the roller to be rotated and brought up to approximately the speed of the web, second, disengaging the roller from the web while accommodating continued rotation thereof, third, engaging the other unit with the other side of the web, and fourth, re-engaging the rotating roller with the respective side of the web at the portion thereof supported by said other unit.

4. A process as set forth in claim 3, including the steps of maintaining the roller substantially parallel to the web while moving the same into and out of engagement with the web, and accommodating up and down and tilting movement of the roller when it is engaged with the web.

5. A process as set forth in claim 4, including the steps of engaging the units with the web adjacent but inwardly of one edge thereof, traversing the two units conjointly across the web after both have been engaged with the web, stopping the traverse adjacent but inwardly of the other edge of the web, disengaging at least one of the units from the web, and returning the units to adjacent said one edge of the web.

6. A process of engaging a pair of detector units with opposite sides of a traveling web where said units comprise first and second rollers journalled on axes substantially parallel to the plane of the web and transverse to the direction of web movement, comprising the steps of engaging the first roller with one side of an unsupported portion of the web to cause the roller to be rotated and brought up to approximately the speed of the web, disengaging said first roller from the web while permitting continued rotation thereof, engaging said second roller with an unsupported portion of the opposite side of the web so as to cause the roller to be rotated and brought up to approximately the speed of the web, and re-engaging the first rotating roller with said one side of the web at a portion thereof supported by said second roller.

References Cited

UNITED STATES PATENTS

| 2,250,460 | 7/1941 | Barnes et al. | 324—37 |
| 2,474,117 | 6/1949 | Rendel. | |
| 1,880,802 | 10/1932 | Chilson | 324—34 |
| 2,395,723 | 2/1946 | Chmielewski | 228—8 |
| 3,244,971 | 4/1966 | Thompson | 324—34 |
| 3,247,596 | 4/1966 | Hintermaier. | |
| 3,304,615 | 2/1967 | Ward et al. | 324—34 |

FOREIGN PATENTS

| 408,340 | 4/1934 | Great Britain. |

OTHER REFERENCES

Hart, J.A., Magnetic Caliper Gauges for Papers; Pulp and Paper Magazine of Canada; November 1951; pp. 102–104 and 118.

RUDOLPH V. ROLINEC, Primary Examiner

R. J. CORCORAN, Assistant Examiner

U.S. Cl. X.R.

33—147; 162—263